(12) United States Patent
Narang et al.

(10) Patent No.: US 7,052,805 B2
(45) Date of Patent: May 30, 2006

(54) POLYMER ELECTROLYTE HAVING ACIDIC, BASIC AND ELASTOMERIC SUBUNITS (75) Inventors: Subhash Narang, Palo Alto, CA (US); Susanna C. Ventura, Los Altos, CA (US); David L. Olmeijer, San Francisco, CA (US)

(73) Assignee: SRI International, Menlo Park, CA (US)

( * ) Notice: Subject to any disclaimer, the term of this patent is extended or adjusted under 35 U.S.C. 154(b) by 533 days.

(21) Appl. No.: 09/872,770

(22) Filed: Jun. 1, 2001

(65) Prior Publication Data

US 2002/0127454 A1   Sep. 12, 2002

Related U.S. Application Data (60) Provisional application No. 60/208,746, filed on Jun. 2, 2000.

(51) Int. Cl.
*H01M 2/16* (2006.01)
*H01M 10/08* (2006.01)

(52) U.S. Cl. ............... 429/314; 252/62.2; 429/303

(58) Field of Classification Search ........... 252/62.2; 429/314, 192–94, 303, 313
See application file for complete search history.

(56) References Cited

U.S. PATENT DOCUMENTS

| 3,013,908 | A | 12/1961 | Luck et al. |
| 3,113,049 | A | 12/1963 | Worsham |
| 3,368,922 | A | 2/1968 | Salyer |
| 4,192,907 | A | 3/1980 | Jalan et al. |
| 4,242,421 | A | 12/1980 | Kudo et al. |
| 4,262,063 | A | 4/1981 | Kudo et al. |
| 4,316,944 | A | 2/1982 | Landsman et al. |
| 4,373,014 | A | 2/1983 | Landsman et al. |
| 4,390,603 | A | 6/1983 | Kawana et al. |
| 4,395,322 | A | 7/1983 | Harris |
| 4,407,904 | A | 10/1983 | Uozumi et al. |
| 4,407,905 | A | 10/1983 | Takeuchi et al. |
| 4,413,041 | A | 11/1983 | Hegedus |

(Continued)

FOREIGN PATENT DOCUMENTS

EP          034248 A1   8/1981

(Continued)

OTHER PUBLICATIONS

Gasteiger, H.A. et al., "$CH_3OH$ Oxidation on Well-Characterized Pt-Ru Alloys," Chemical Engineering Department University of California at Berkeley and Lawrence Berkeley Laboratory, pp. 1-5, Mar. 1993.

(Continued)

*Primary Examiner*—Mark Ruthkosky
(74) *Attorney, Agent, or Firm*—Lumen Intellectual Property Services, Inc.

(57) ABSTRACT

The invention includes compositions comprising at least first and second polymers and optionally a third polymer wherein acid subunits, basic subunits and elastomeric subunits are contained in the polymers. In one aspect, the composition comprises a ternary polymer blend comprising an acidic polymer comprising acidic subunits, a basic polymer comprising basic subunits and an elastomeric polymer comprising elastomeric subunits. In an alternate aspect, the composition comprises a binary polymer blend which comprises acidic or basic subunits in one polymer and a copolymer comprising the other of the acidic or basic subunit and an elastomeric subunit. Such polymer compositions may be formed into a membrane having electrochemical properties which permit the use of such a membrane in an electrochemical device.

4 Claims, 7 Drawing Sheets

U.S. PATENT DOCUMENTS

| | | | |
|---|---|---|---|
| 4,417,969 | A | 11/1983 | Ezzell et al. |
| 4,420,544 | A | 12/1983 | Lawson et al. |
| 4,446,210 | A | 5/1984 | Okada et al. |
| 4,447,506 | A | 5/1984 | Luczak et al. |
| 4,456,521 | A | 6/1984 | Solomon et al. |
| 4,476,002 | A | 10/1984 | Howard et al. |
| 4,478,917 | A | 10/1984 | Fujita et al. |
| 4,481,266 | A | 11/1984 | Littauer et al. |
| 4,524,113 | A | 6/1985 | Lesieur |
| 4,537,840 | A | 8/1985 | Tsukui et al. |
| 4,542,079 | A | 9/1985 | Takeuchi et al. |
| 4,562,123 | A | 12/1985 | Shimizu et al. |
| 4,576,877 | A | 3/1986 | Alfenaar |
| 4,612,261 | A | 9/1986 | Tsukui et al. |
| 4,614,692 | A | 9/1986 | Kajiyama et al. |
| 4,614,837 | A | 9/1986 | Kane et al. |
| 4,629,664 | A | 12/1986 | Tsukui et al. |
| 4,643,806 | A | 2/1987 | Hegedus et al. |
| 4,647,359 | A | 3/1987 | Lindstrom |
| 4,670,359 | A | 6/1987 | Beshty et al. |
| 4,673,624 | A | 6/1987 | Hockaday |
| 4,702,973 | A | 10/1987 | Marianowski |
| 4,716,087 | A | 12/1987 | Ito et al. |
| 4,755,272 | A | 7/1988 | Plowman |
| 4,761,209 | A | 8/1988 | Bonaventura et al. |
| 4,761,349 | A | 8/1988 | McPheeters et al. |
| 4,769,296 | A | 9/1988 | Sterzel |
| 4,774,152 | A | 9/1988 | Matsumura et al. |
| 4,774,153 | A | 9/1988 | Sterzel |
| 4,794,054 | A | 12/1988 | Ito et al. |
| 4,808,493 | A | 2/1989 | Breault |
| 4,820,594 | A | 4/1989 | Sugita et al. |
| 4,828,941 | A | 5/1989 | Sterzel |
| 4,855,193 | A | 8/1989 | McElroy |
| 4,865,906 | A | 9/1989 | Smith, Jr. |
| 4,865,925 | A | 9/1989 | Ludwig et al. |
| 4,876,115 | A | 10/1989 | Raistrick |
| 4,937,220 | A | 6/1990 | Nickols, Jr. |
| 4,970,128 | A | 11/1990 | Itoh et al. |
| 4,985,386 | A | 1/1991 | Tsurumi et al. |
| 4,988,582 | A | 1/1991 | Dyer |
| 5,004,424 | A | 4/1991 | Larminie |
| 5,019,463 | A | 5/1991 | Matsubara et al. |
| 5,024,905 | A | 6/1991 | Itoh et al. |
| 5,034,288 | A | 7/1991 | Bossel |
| 5,035,962 | A | 7/1991 | Jensen |
| 5,061,581 | A | 10/1991 | Narang et al. |
| 5,068,161 | A | 11/1991 | Keck et al. |
| 5,079,107 | A | 1/1992 | Jalan |
| 5,084,144 | A | 1/1992 | Reddy et al. |
| 5,094,928 | A | 3/1992 | Dyer |
| 5,102,750 | A | 4/1992 | Taylor |
| 5,102,751 | A | 4/1992 | Narang et al. |
| 5,132,193 | A | 7/1992 | Reddy et al. |
| 5,171,644 | A | 12/1992 | Tsou et al. |
| 5,178,971 | A | 1/1993 | Itoh et al. |
| 5,183,713 | A | 2/1993 | Kunz |
| 5,186,877 | A | 2/1993 | Watanabe |
| 5,189,005 | A | 2/1993 | Watanabe et al. |
| 5,208,207 | A | 5/1993 | Stonehart et al. |
| 5,219,679 | A * | 6/1993 | Abraham et al. ............ 429/310 |
| 5,225,391 | A | 7/1993 | Stonehart et al. |
| 5,234,772 | A | 8/1993 | Oguchi et al. |
| 5,234,777 | A | 8/1993 | Wilson |
| 5,252,410 | A | 10/1993 | Wilkinson et al. |
| 5,262,250 | A | 11/1993 | Watanabe |
| 5,271,917 | A | 12/1993 | Hoffman |
| 5,284,718 | A | 2/1994 | Chow et al. |
| 5,284,878 | A | 2/1994 | Studer et al. |
| 5,294,317 | A | 3/1994 | Saito et al. |
| 5,294,580 | A | 3/1994 | Dufner |
| 5,298,343 | A | 3/1994 | Savadogo et al. |
| 5,312,876 | A | 5/1994 | Dang et al. |
| 5,312,895 | A | 5/1994 | Dang et al. |
| 5,314,760 | A | 5/1994 | Tsou et al. |
| 5,314,762 | A | 5/1994 | Hamada et al. |
| 5,316,643 | A | 5/1994 | Ahn et al. |
| 5,330,860 | A | 7/1994 | Grot et al. |
| 5,346,780 | A | 9/1994 | Suzuki |
| 5,367,051 | A | 11/1994 | Narang et al. |
| 5,378,508 | A | 1/1995 | Castro |
| 5,384,208 | A | 1/1995 | Brand et al. |
| 5,403,675 | A | 4/1995 | Ogata et al. |
| 5,432,023 | A | 7/1995 | Yamada et al. |
| 5,438,082 | A | 8/1995 | Helmer-Metzmann et al. |
| 5,468,574 | A | 11/1995 | Ehrenberg et al. |
| 5,472,799 | A | 12/1995 | Watanabe |
| 5,480,735 | A | 1/1996 | Landsman et al. |
| 5,488,087 | A | 1/1996 | Cabasso et al. |
| 5,489,563 | A | 2/1996 | Brand et al. |
| 5,501,915 | A | 3/1996 | Hards et al. |
| 5,503,944 | A | 4/1996 | Meyer et al. |
| 5,505,851 | A | 4/1996 | Wagener et al. |
| 5,523,177 | A | 6/1996 | Kosek et al. |
| 5,525,436 | A | 6/1996 | Savinell et al. |
| 5,525,568 | A | 6/1996 | Yamaguchi et al. |
| 5,540,981 | A | 7/1996 | Gallagher et al. |
| 5,547,911 | A | 8/1996 | Grot |
| 5,548,055 | A | 8/1996 | Narang et al. |
| 5,561,202 | A | 10/1996 | Helmer-Metzmann et al. |
| 5,573,866 | A | 11/1996 | Van Dine et al. |
| 5,576,074 | A | 11/1996 | Weigel et al. |
| 5,599,638 | A | 2/1997 | Surampudi et al. |
| 5,616,431 | A | 4/1997 | Kusunoki et al. |
| 5,631,099 | A | 5/1997 | Hockaday |
| 5,633,098 | A | 5/1997 | Narang et al. |
| 5,635,039 | A | 6/1997 | Cisar et al. |
| 5,641,586 | A | 6/1997 | Wilson |
| 5,643,690 | A | 7/1997 | Tateishi et al. |
| 5,670,266 | A | 9/1997 | Thomas et al. |
| 5,672,439 | A | 9/1997 | Wilkinson et al. |
| 5,683,829 | A | 11/1997 | Sarangapani |
| 5,700,595 | A | 12/1997 | Reiser |
| 5,702,836 | A | 12/1997 | Ma et al. |
| 5,702,838 | A | 12/1997 | Yasumoto et al. |
| 5,723,229 | A | 3/1998 | Scheifers et al. |
| 5,731,104 | A | 3/1998 | Ventura et al. |
| 5,741,408 | A | 4/1998 | Helmer-Metzmann et al. |
| 5,759,712 | A | 6/1998 | Hockaday |
| 5,773,162 | A | 6/1998 | Surampudi et al. |
| 5,789,093 | A | 8/1998 | Malhi |
| 5,795,496 | A | 8/1998 | Yen et al. |
| 5,798,187 | A | 8/1998 | Wilson et al. |
| 5,804,325 | A | 9/1998 | Yepez |
| 5,834,523 | A | 11/1998 | Steck et al. |
| 5,834,566 | A | 11/1998 | Helmer-Metzmann et al. |
| 5,846,615 | A | 12/1998 | Sharma et al. |
| 5,856,036 | A | 1/1999 | Smotkin et al. |
| 5,858,568 | A | 1/1999 | Hsu et al. |
| 5,863,673 | A | 1/1999 | Campbell et al. |
| 5,874,182 | A | 2/1999 | Wilkinson et al. |
| 5,876,867 | A | 3/1999 | Itoh et al. |
| 5,885,338 | A | 3/1999 | Nigam et al. |
| 5,894,038 | A | 4/1999 | Sharma et al. |
| 5,904,740 | A | 5/1999 | Davis |
| 5,906,716 | A | 5/1999 | Mertesdorf et al. |
| 5,916,699 | A | 6/1999 | Thomas et al. |
| 5,916,702 | A | 6/1999 | Marucchi-Soos et al. |
| 5,922,487 | A | 7/1999 | Watanabe et al. |
| 5,928,806 | A | 7/1999 | Olah et al. |
| 5,945,231 | A | 8/1999 | Narayanan et al. |
| 5,952,119 | A | 9/1999 | Wilson |
| 5,954,928 | A | 9/1999 | Kishi et al. |
| 5,958,616 | A | 9/1999 | Salinas et al. |

| | | |
|---|---|---|
| 5,973,025 A | 10/1999 | Nigam et al. |
| 5,976,725 A | 11/1999 | Gamo et al. |
| 5,980,998 A | 11/1999 | Sharma et al. |
| 5,981,095 A | 11/1999 | Leddy et al. |
| 5,984,986 A | 11/1999 | Wiesheu et al. |
| 5,985,942 A | 11/1999 | Steck et al. |
| 5,992,008 A | 11/1999 | Kindler |
| 5,993,984 A | 11/1999 | Matsumura et al. |
| 5,998,599 A | 12/1999 | Ruegg et al. |
| 6,007,930 A | 12/1999 | Adams et al. |
| 6,007,934 A | 12/1999 | Auer et al. |
| 6,010,798 A | 1/2000 | Hammerschmidt et al. |
| 6,017,650 A | 1/2000 | Ramunni et al. |
| 6,040,077 A | 3/2000 | Debe et al. |
| 6,045,934 A | 4/2000 | Enami |
| 6,048,473 A | 4/2000 | Denda et al. |
| 6,057,051 A | 5/2000 | Uchida et al. |
| 6,057,054 A | 5/2000 | Barton et al. |
| 6,060,190 A | 5/2000 | Campbell et al. |
| 6,066,410 A | 5/2000 | Auer et al. |
| 6,068,941 A | 5/2000 | Fuller et al. |
| 6,071,635 A | 6/2000 | Carlstrom, Jr. |
| 6,074,773 A | 6/2000 | Wilkinson et al. |
| 6,080,501 A | 6/2000 | Kelley et al. |
| 6,080,503 A | 6/2000 | Schmid et al. |
| 6,090,193 A | 7/2000 | Nigam et al. |
| 6,093,502 A | 7/2000 | Carlstrom, Jr. et al. |
| 6,100,600 A | 8/2000 | Pflanz |
| 6,106,965 A | 8/2000 | Hirano et al. |
| 6,110,613 A | 8/2000 | Fuller |
| 6,110,616 A | 8/2000 | Sheikh-Ali et al. |
| 6,117,222 A | 9/2000 | Nigam et al. |
| 6,117,579 A | 9/2000 | Gyoten et al. |
| 6,127,055 A | 10/2000 | Simmons, Jr. |
| 6,171,444 B1 | 1/2001 | Nigam |
| 6,214,251 B1 * | 4/2001 | Wu et al. ............... 252/62.2 |
| 6,241,787 B1 | 6/2001 | Nigam |
| 6,248,480 B1 * | 6/2001 | Narang et al. .......... 429/314 |
| 6,264,857 B1 * | 7/2001 | Kreuer et al. ........... 252/500 |
| 6,309,772 B1 | 10/2001 | Zuber et al. |
| 6,326,097 B1 | 12/2001 | Hockaday |
| 6,326,099 B1 | 12/2001 | Schubert |
| 6,465,136 B1 * | 10/2002 | Fenton et al. ........... 429/309 |
| 2002/0045085 A1 | 4/2002 | Formato et al. |
| 2002/0091225 A1 | 7/2002 | McGarth et al. |

FOREIGN PATENT DOCUMENTS

| | | |
|---|---|---|
| EP | 068508 B1 | 9/1986 |
| EP | 0337626 A1 | 3/1989 |
| EP | 310860 A1 | 9/1998 |
| EP | 900 834 A1 * | 3/1999 |
| EP | 0574791 B1 | 12/1999 |
| WO | WO 95/27759 A1 | 10/1995 |
| WO | WO 98/22989 A1 | 5/1998 |
| WO | WO 99/54389 A1 | 10/1999 |
| WO | WO 99/54407 A2 | 10/1999 |
| WO | WO 00/09610 A1 | 2/2000 |
| WO | WO 00/10736 A1 | 2/2000 |
| WO | WO 00/22684 A3 | 4/2000 |
| WO | WO 00/24796 | 4/2000 |
| WO | WO 00/27513 A2 | 5/2000 |

OTHER PUBLICATIONS

Gasteiger, H., Methanol Electro-Oxidation on Well-Charterized Pt-Ru Alloys Temperature Effects, The Electrochemical Society Interface, pp. 49-50, 1994.

Kerres, J. et al., "Synthesis and Characterization of Novel Acid-Base Polymer Blends for Application in Membrane Fuel Cells," Solid State Sonics 125, pp. 243-249, 1999.

Miyatake et al., "Synthesis of Poly (phenylene sulfide sulfonic acid) via Poly (sulfonium cation) as a Thermostable Proton-Conducting Polymer," Macromolecules, 29, pp. 6969-6971, 1996.

Miyatake et al., "Synthesis and Proton conductivity of Highly Sulfonated Poly (thiophenylene)," Macromolecules, 30, pp. 2941-2946, 1997.

Parsons, R. et al., "The Oxidation of Small Organic Molecules A Survey of Recent Fuel Cell Related Research," Department of Chemistry, The University, Southampton S09 5NH (Great Britain), pp. 9-45, Jul. 1998.

Rulkens et al., "Rigid-Rod Polyelectrolytes Based on Poly (p-Phenylene Sulfonic Acid)," Ber. Bunsenges. Phys. Chem., 100(6), pp. 707-714, 1996.

Wang et al., "A H2/O2 Fuel Cell Using Acid Doped Polybenzimidazole as Polymer Electrolyte," Electrochemical Society Proceedings, 95-23, pp. 707-714, 1996.

Wheeler, D.J. et al., "Requirements for the Direct Methanol/Air Fuel Cell," Proceedings of the Workshop on Direct Methanol/Air Fuel Cells, vol. 92-14, The Electrochemical Society, pp. 193-205, 1995.

* cited by examiner

Membrane 1: 81.5% sPEEK; 15.5% PBI and 3% PAN

Membrane 1: SPEEK 75% PBI 20%, 5% PAN

POLYMER ELECTROLYTE HAVING ACIDIC, BASIC AND ELASTOMERIC SUBUNITS

CROSS REFERENCE TO RELATED APPLICATIONS

This application claims the benefit of U.S. provisional application No. 60/208,746 filed on Jun. 2, 2000.

TECHNICAL FIELD

Novel polymer membranes are disclosed which have desirable electrochemical properties rendering them useful in the formation of electrochemical devices such as batteries and fuel cells.

BACKGROUND OF THE INVENTION

Polymer electrolyte membranes are useful in electrochemical devices such as batteries and fuel cells since they function as electrolyte and separator. Such membranes may be readily fabricated as thin flexible films which can be incorporated into cells of variable shape.

Perfluorinated hydrocarbon sulfonate ionomers, such as Nafion® by DuPont or analogous Dow perfluorinated polymers, are presently used as polymer electrolyte membranes for fuel cells. Such prior art membranes, however, have severe limitations when used in hydrogen/air fuel cells and liquid feed direct methanol fuel cells.

Perfluorinated hydrocarbon sulfonate ionomer membranes cannot be operated over a prolonged period of time at temperatures higher than 85° C. without showing decomposition and performance degradation. As such, they cannot be used in hydrogen/air fuel cells at 120° C. or higher as required to minimize poisoning of the anode catalyst by carbon monoxide which is present when reformate hydrogen gas is used.

Perfluorinated hydrocarbon sulfonate ionomer membranes have also been shown to have high permeability to liquid methanol. Therefore, liquid feed direct methanol polymer electrolyte membrane fuel cells based on Nafion® or similar perfluorinated hydrocarbon sulfonate ionomer membranes have poor efficiency and low power densities.

Accordingly, it is an object herein to provide polymer membranes which have high proton conductivity, high temperature stability and/or low methanol permeability.

SUMMARY OF THE INVENTION

The invention includes compositions comprising at least first and second polymers and optionally a third polymer wherein acid subunits, basic subunits and elastomeric subunits are contained in the polymers.

In one embodiment, the composition comprises a ternary polymer blend comprising an acidic polymer comprising acidic subunits, a basic polymer comprising basic subunits and an elastomeric polymer comprising elastomeric subunits. In some embodiments, one or more of the polymers, preferably the elastomeric polymer, comprises a semi-interpenetrating network (IPN). In an alternate embodiment, the composition comprises a binary polymer blend which comprises acidic or basic subunits in one polymer and a copolymer comprising the other of the acidic or basic subunit and an elastomeric subunit. Such polymer compositions may be formed into any shape. However, it is preferred that such compositions be formed into a membrane having electrochemical properties which permit the use of such a membrane in an electrochemical device.

The acidic polymer of the polymer membrane preferably comprises subunits containing sulfonic acid, phosphoric acid or carboxylic acid groups. Sulfonated polyetherether ketone (sPEEK) is the preferred acidic polymer.

The basic polymer of the polymer electrolyte membrane preferably comprises subunits containing aromatic amine, aliphatic amine or heterocyclic nitrogen. Polybenzimidazole (PBI) is an example of a basic polymer. Polyvinylimidazole (PVI) is a preferred basic polymer. The elastomeric polymer is preferably polyacrylonitrile (PAN).

In the binary polymer blend, one polymer is an acidic polymer; preferably sPEEK while the second polymer is an elastomeric copolymer, preferably of vinylimidazole and acrylonitrile.

The polymer membrane is preferably permeable to protons but substantially impermeable to organic fuels such as methanol. It also has physical properties which facilitate its use in the fabrication of electrochemical devices and fuel cells.

In the case of fuel cells, the polymer membrane can be used in conjunction with other components to form a membrane electrode assembly (MEA). In an MEA, the polymer membrane is combined with a cathode catalyst on one side of the membrane and an anode catalyst on an opposing surface. A cathode electrode and an anode electrode are in electrical contact with the respective catalyst layers. Such an arrangement facilitates catalytic conversion of a fuel such as hydrogen or methanol on the anode side of the MEA to form ionic species such as protons which are transported across the polymer membrane and electrons which are transmitted through the anode electrode to a load and thence to the cathode. On the cathode side of the membrane, the second catalyst facilitates the reduction of an oxidant such as oxygen which forms water by combining with the proton comprising a cationic current across the membrane.

The invention further includes electrochemical devices which comprise the polymer membrane of the invention including electrolyzers, batteries, energy storage devices, chemical sensors, electro-chromic devices and fuel cells.

The invention also includes electronic devices which incorporate the fuel cells and the invention.

BRIEF DESCRIPTION OF THE DRAWINGS

FIG. 1 schematically shows a fuel cell incorporating a membrane electrode assembly of the invention. The electrolyte corresponds to a polymer membrane of the invention on which two catalyst layers are formed. The catalyst on the anodic side of the membrane is preferably a platinum ruthenium catalyst while the catalyst on the cathode side is preferably a platinum catalyst. In electrical contact with each of the catalysts are an anode electrode and cathode electrode which act as a means to conduct electrons from the anode to the cathode.

| Temperature/° C. | current density @ 0.6 V/Acm$^{-2}$ | Cell resistance @ 0.6 V/ohm |
|---|---|---|
| 80 | 0.44 | 0.036 |
| 120 | 0.65 | 0.035 |
| 140 | 0.80 | 0.026 |

DETAILED DESCRIPTION OF THE INVENTION

As used herein, the term "acidic polymer" refers to a polymeric backbone which contains one or more acidic subunits. In a preferred embodiment, the backbone contains carbon alone or in combination with oxygen, nitrogen or sulfur. Particularly preferred embodiments include aromatic backbones although aliphatic polymers may also be used. More particularly, an acidic polymer contains acidic subunits which preferably comprise acidic groups including sulphonic acid, phosphoric acid and carboxylic acid groups. Examples of polymers containing sulfonic acid group include perfluorinated sulfonated hydrocarbons, such as Nafion®; sulfonated aromatic polymers such as sulfonated polyetheretherketone (sPEEK), sulfonated polyetherethersulfone (sPEES), sulfonated polybenzobisbenzazoles, sulfonated polybenzothiazoles, sulfonated polybenzimidazoles, sulfonated polyamides, sulfonated polyetherimides, sulfonated polyphenyleneoxide, sulfonated polyphenylenesulfide, and other sulfonated aromatic polymers. The sulfonated aromatic polymers may be partially or fully fluorinated. Other sulfonated polymers include polyvinysulfonic acid, sulfonated polystyrene, copolymers of acrylonitrile and 2-acrylamido- 2-methyl-1 propane sulfonic acid, acrylonitrile and vinylsulfonic cid, acrylonitrile and styrene sulfonic acid, acrylonitrile and methacryloxyethyleneoxypropane sulfonic acid, acrylonitrile and methacryloxyethyleneoxytetrafluoroethylenesulfonic acid, and so on. The polymers may be partially or fully fluorinated. Any class of sulfonated polymer includes sulfonated polyphosphazenes, such as poly(sulfophenoxy)phosphazenes or poly(sulfoethoxy)phosphazenes. The phosphazene polymers may be partially or fully fluorinated. Also included are sulfonated polyphenylsiloxanes and copolymers, poly (sulfoalkoxy) phosphazenes, and poly (sulfotetrafluoroethoxypropoxy) siloxane. In addition, copolymers of any of the polymers can be used. It is preferred that the sPEEK be sulfonated between 60 and 200%, more preferably between 70 to 150% and most preferably between 80 to 120%. In this regard, 100% sulfonated indicates one sulfonic acid group per polymer repeating unit.

Examples of polymers with carboxylic acid groups include polyacrylic acid, polymethacrylic acid, any of their copolymers including copolymers with vinylimidazole or acrylonitrile, and so on. The polymers may be partially or fully fluorinated.

Examples of acidic polymers containing phosphoric acid groups include polyvinylphosphoric acid, polybenzimidazole phosphoric acid and so on. The polymers may be partially or fully fluorinated.

As used herein, a basic polymer refers to a polymeric backbone which contains one or more basic subunits. In a preferred embodiment, the backbone contains carbon alone or in combination with oxygen, nitrogen or sulfur. Particularly preferred backbones include aliphatic backbones although aromatic polymer backbones may also be used. More particularly, a basic polymer contains basic subunits which preferably comprise basic groups such as aromatic amines, aliphatic amines or heterocyclic nitrogen containing groups.

Examples of basic polymers include aromatic polymers such as polybenzimidazole, polyvinylimidazole, N-alkyl or N-arylpolybenzimidazoles, polybenzothiazoles, polybenzoxazoles, polyquinolines, and in general polymers containing functional groups with heteroaromatic nitrogens, such as oxazoles, isooxazoles, carbazole, indoles, isoindole, 1,2,3-oxadiazole, 1,2,3-thiadiazole, 1,2,4-thiadiazole, 1,2,3-triazole, benzotriazole, 1,2,4-traozole, tetrazole, pyrrole, N-alkyl or N-aryl pyrrole, pyrrolidine, N-alkyl and N-arylpyrrolidine, pyridine, pyrrazole groups and so on. These polymers may be optionally partially or fully fluorinated.

Examples of aliphatic polyamines include polyethyleneimines, polyvinylpyridine, poly(allylamine), and so on. These basic polymers may be optionally partially or fully fluorinated.

Polybenzimidazole (PBI) is a preferred basic polymer. Polyvinylimidazole (PVI) is a particularly preferred basic polymer.

As used herein, an "elastomeric polymer" refers to a polymeric backbone which contains one or more elastomeric subunits. In a preferred embodiment, the backbone contains carbon alone or in combination with oxygen, nitrogen, fluorine or sulfur. Particularly preferred embodiments include aliphatic backbones although aromatic polymer backbones may also be used. More particularly, an elastomeric polymer comprises elastomeric subunits which preferably contain elastomeric groups such as nitrile, vinylidene fluoride, siloxane and phosphazene groups. Examples of elastomeric polymers include polyacrylonitrile, acrylonitrile copolymers, polyvinyilidene fluoride, vinylidene fluoride copolymers, polysiloxanes, siloxane copolymers and polyphosphazenes, such as poly(trifluormethylethoxy)phosphazene.

The elastomeric polymer may be added to the polymer membrane in the form of polymerizable monomer to fabricate semi-interpenetrating networks. The monomers may be polymerized photochemically or by thermal treatment for the semi-IPN.

As used herein, an elastomeric copolymer refers to an elastomeric polymer which contains elastomeric subunits and one or more acidic subunits or basic subunits depending upon which embodiment of the invention is being practiced. For example, if an acidic polymer such as sPEEK is used, an elastomeric copolymer comprising elastomeric subunits and basic subunits may be used in a binary composition. Alternatively, should a basic polymer be used, the elastomeric copolymer will comprise elastomeric subunits and acid subunits. Such binary mixtures may be used in conjunction with other polymers and copolymers to form additional compositions within the scope of the invention.

The acid equivalent weight of the polymer containing the acid group (sulfonic acid, carboxylic acid and/or phosphoric acid) is selected within a suitable range to provide high proton conductivity. When used in a ternary blend, i e., a mixture of an acidic polymer, a basic polymer and an elastomeric polymer. The acid polymer will be used in the composition in a concentration varying from 10% to 99% by weight, more preferably 30 to 95% by weight and most preferably between about 50 and 90% by weight.

The function of the polymer containing the basic functional group is to form pseudo crosslinking with the polymer containing the acid group via acid-base interaction. Pseudo crosslinking is needed to prepare films that are mechanically stable at high humidities and in boiling water. When used in a ternary blend, the basic polymer will be used in the composition in a concentration varying from 0.5% to 50% by weight, more preferably between 2.5 to 40% by weight, still more preferably between about 5 and 25% by weight.

The function of the elastomeric polymer is to allow the fabrication of polymer membranes with superior mechanical properties as well as membranes having low methanol permeability. The elastomeric polymer will be used in concentration varying from 0.5% to 50% by weight, more preferably between 2.5 to 40% by weight and most preferably between about 5 and 25% by weight.

In a particularly preferred embodiment, the ternary blend membrane contains sulfonated polyetheretherketone (sPEEK) as acidic polymer, polyvinylimidazole (PVI) as a basic polymer and polyacrylonitrile (PAN) as elastomeric polymer. In the best mode of practicing the invention, this composition contains 85.4% sPEEK by weight, 11.6% PVI by weight and 3% PAN by weight.

In those embodiments, when the composition comprises two polymers, i.e., in a binary blend, the acid polymer can constitute any one of the aforementioned acidic polymers. It is preferred that when an acidic polymer is chosen, that the polymer be sPEEK. In such circumstances, the second polymer comprises an elastomeric copolymer containing elastomeric subunits and basic subunits. In this embodiment, the basic subunit is preferably vinylimidazole and the elastomeric subunit is acrylonitrile. While good membranes can be obtained with such a binary system, a basic polymer may optionally be added. When so used, it is preferred that polyvinylimidazole be used although polybenzimidazole may also be used.

In the composition comprising a binary polymer blend, wherein an acidic polymer is used, it is preferred that the acidic polymer comprise sPEEK. It is also preferred that the acidic polymer have a concentration of between about 10 to 99%, more preferably between 30 to 95% and most preferably between 50 to 90%. In addition, it is preferred that the elastomeric copolymer containing a basic subunit be present at a concentration of between 1 to 90%, more preferably between 5 to 70% and most preferably between 10 to 50%. The foregoing concentrations of the elastomeric copolymer are for situations wherein the elastomeric copolymer comprises about 50% elastomeric subunits. However, the amount of elastomeric copolymer will vary depending upon the base content of the elastomer copolymer. In general, the lower the base content of the elastomeric copolymer, the higher the amount of copolymer which can be used. Similarly, a reduction in the amount of basic subunit results in a higher level of copolymer which can be used. Preferred ranges for basic/elastomer subunits in the copolymer are from 99:1 to 1:99.

When a basic polymer is used in the binary polymer blend, it is preferred that the basic polymer be polybenzimidazole and most preferably polyvinylimidazole. Generally the basic polymer will be present at a concentration of about between 1 to 90 weight percent, more preferably between 5 to 70 weight percent and most preferably between 10 to 50 weight percent. In such circumstances, the elastomeric copolymer preferably contains acrylonitrile subunits and sulfonic acid monomer subunits, preferably sulfonated acrylates or acrylamides subunits. The elastomeric copolymers generally are present at a concentration of between 10 to 99 weight percent, more preferably between 30 to 95 weight percent and most preferably between 50 to 95 weight percent. These concentrations are applicable when the amount of sulfonic acid subunit is present at about 50 weight percent. Higher amounts of acid monomer allow for a lower concentration of the elastomeric copolymer, likewise, increased amounts of acid monomer in the copolymer allows for a lower amount of the copolymer to be used. Preferred ranges for acid and elastomeric subunits in the elastomeric copolymer are 1:99 to 99:1. Although such a binary system can be used, an acid polymer such as sPEEK may be optionally incorporated into the binary system.

In an alternate preferred embodiment of the binary polymer blend, the membrane comprises a basic polymer comprising polyvinylimidazole and an elastomeric copolymer comprising acrylonitrile and 2-acryloamido-2-methel-1-propane sulfonic acid.

In each of the foregoing binary systems, the addition of an additional acid or basic polymer essentially results in the conversion of the binary polymer to a ternary polymer wherein the elastomeric polymer becomes an elastomeric copolymer containing either acid or basic subunits.

Polymer membranes may be fabricated by solution casting of the binary or ternary polymer blends. In this case the elastomeric polymer is added to a solution of the acid and basic polymer.

Alternatively the composite polymer membrane may be fabricated by solution casting the blend of the acid and basic polymer. The resulting polymer membrane is then swollen into a reactive monomer precursor to the elastomeric polymer (e.g., acrylonitrile). A radical photo- or thermal-initiator will be added to the reactive monomer so that the resulting swollen membrane may be photoexposed to UV-Vis light or thermally treated to form the elastomeric polymer. In this case the composite polymer membrane is best described as semi-interpenetrating polymer network since the elastomeric polymer is prepared in-situ in the presence of the acid and basic polymers. A small percentage of crosslinking agent may be added to the reactive monomer to form a lightly crosslinked polymer network for improved mechanical stability.

When cast into a membrane for use in a fuel cell, it is preferred that the membrane thickness be between 1 to 10 mils, more preferably between 2 and 6 mils, most preferably between 3 and 4 mils.

As used herein, a membrane is permeable to protons if the proton flux is greater than approximately 0.005 S/cm, more preferably greater than 0.01 S/cm, most preferably greater than 0.02 S/cm.

As used herein, a membrane is substantially impermeable to methanol if the methanol transport across a membrane having a given thickness is less than the transfer of methanol across a Nafion membrane of the same thickness. In preferred embodiments the permeability of methanol is preferably 50% less than that of a Nafion membrane, more preferably 75% less and most preferably greater than 80% less as compared to the Nafion membrane.

It should be noted that depending on the choice of the elastomeric copolymer, the basic polymer may or may not be needed in the formulation of the composite membrane. Indeed the elastomeric polymer may provide improved film forming properties and mechanical stability especially if a small degree of crosslinking agent is used.

The polymer composition of the invention, be it a binary or ternary blend, may be formed into a membrane and thereafter used to produce a membrane electrode assembly (MEA). As used herein, an MEA refers to a polymer membrane made according to the invention in combination with anode and cathode catalysts positioned on opposite sides of the polymer membrane. It may also include anode and cathode electrodes which are in electrical contact with the catalysts layers.

In general, anode and cathode catalysts are applied onto the membrane by well established standard techniques. For direct methanol fuel cells, platinum/ruthenium catalyst is typically used on the anode side while platinum catalyst is applied on the cathode side. For hydrogen/air or hydrogen/oxygen fuel cells platinum or platinum/ruthenium is generally applied on the anode side, and platinum is applied on the cathode side. Catalysts may be optionally supported on carbon. The catalyst is initially dispersed in a small amount of water (about 100 mg of catalyst in 1 g of water). To this dispersion a 5% Nafion solution in water/alcohol is added (0.25–0.75 g). The resulting dispersion may be directly painted onto the polymer membrane. Alternatively, isopropanol (1–3 g) is added and the dispersion is directly sprayed onto the membrane. The catalyst may also be applied onto the membrane by decal transfer, as described in the open literature (*Electrochimica Acta*, 40: 297 (1995)).

The electrodes are in electrical contact with a membrane, either directly or indirectly, when they are capable of completing an electrical circuit which includes the polymer membrane and a load to which a electric current is supplied. More particularly, a first catalyst is electrocatalytically associated with the anode side of the membrane so as to facilitate the oxidation of hydrogen or organic fuel. Such oxidation generally results in the formation of protons, electrons, carbon dioxide and water. Since the membrane is substantially impermeable to molecular hydrogen and organic fuels such as methanol, as well as carbon dioxide, such components remain on the anodic side of the membrane. Electrons formed from the electro catalytic reaction are transmitted from the cathode to the load and then to the anode. Balancing this direct electron current is the transfer of an equivalent number of protons across the membrane to the anodic compartment. There an electro catalytic reduction of oxygen in the presence of the transmitted protons occurs to form water. In one embodiment, air is the source of oxygen. In another embodiment, oxygen-enriched air is used.

The membrane electrode assembly is generally used to divide a fuel cell into anodic and cathodic compartments. In such fuel cell systems, a fuel such as hydrogen gas or an organic fuel such as methanol is added to the anodic compartment while an oxidant such as oxygen or ambient air is allowed to enter the cathodic compartment. Depending upon the particular use of a fuel cell, a number of cells can be combined to achieve appropriate voltage and power output. Such applications include electrical power sources for residential, industrial, commercial power systems and for use in locomotive power such as in automobiles. Other uses to which the invention finds particular use includes the use of fuel cells in portable electronic devices such as cell phones and other telecommunication devices, video and audio consumer electronics equipment, computer laptops, computer notebooks, personal digital assistants and other computing devices, GPS devices and the like.

Further, such polymer membranes and electrode assemblies of the invention are generally useful in fuel cells such as those disclosed in U.S. Pat. Nos. 5,945,231, 5,773,162, 5,992,008, 5,723,229, 6,057,051, 5,976,725, 5,789,093, 4,612,261, 4,407,905, 4,629,664, 4,562,123, 4,789,917, 4,446,210, 4,390,603, 6,110,613, 6,020,083, 5,480,735, 4,851,377, 4,420,544, 5,759,712, 5,807,412, 5,670,266, 5,916,699, 5,693,434, 5,688,613, 5,688,614, each of which is expressly incorporated herein by reference.

The polymer membranes of the invention also find use as separators in batteries. Particularly preferred batteries are lithium ion batteries.

EXAMPLES

Example 1

Sulfonated polyetheretherketone (sPEEK) was synthesized by treating PEEK with chlorosulfonic acid as previously described. The sulfonated polyetheretherketone was dissolved in dimethylacetamide and polymer membrane was cast from solution. The membrane was dried from room temperature up to 120° C., and finally under vacuum to remove the last traces of solvent.

The membrane was then transferred into a round bottom flask containing 95% wt/wt acrylonitrile 4% pentaerytritol triacrylate and 1% Lucirin TPO. The membrane was treated in reflux in the acrylonitrile solution for 4 hours. The acrylonitrile embedded in the polymer membrane was then polymerized by exposure to UV light.

Example 2

0.75 g of sulfonated PEEK (sPEEK) is dissolved in 21.1 g of dimethylacetamide (DMAC). 10 drops of ammonia are added to this solution. 0.05 g of polyacrylonitrile (PAN) is added (0.8 g of a 6.25% solution of PAN in DMAC). 0.20 g of polybenzimidazole are added (3.3 g of a 6% solution). The homogeneous solution is cast at room temperature into a 12.7 cm×12.7 cm mold. After drying at room temperature the polymer membranes is soaked in 0.5M sulfuric acid solution for 16 hours, then boiled in the same solution for 2 hours, and finally rinsed in deionized water.

The polymer membrane was swollen in boiling water (water uptake 66.7%). The polymer membrane conductivity was measured by AC impedance. The proton conductivity at 30° C. was found to be 0.094 S/cm and at 60° C. it was 0.125 S/cm.

Example 3

This example discloses a membrane comprising 81.8% sPEEK, 9.1% PVI and 9.1% elastomeric copolymer acrylonitrile-vinylimidazole (30:1).

Sulfonated polyetheretherketone (sPEEK) (0.9 g) was dissolved in 15 g of dimethylacetamide (DMAC). To this solution, 30% ammonium hydroxide (1.6 g) was added. A solution of acrylonitrile-vinylimidazole copolymer (molar ratio 30:1) in DMAC was added (addition corresponds to 0.1 g of the copolymer), followed by an addition of polyvinylimidazole (PVI) (0.1 g). The mixture was stirred overnight. The resulting solution was cast onto a silanized glass frame (size 5"×5"). The membrane was dried at room temperature for two days, then vacuum dried at 60° C. for 8 hours. The resulting membrane was soaked in 1M $H_2SO_4$ at room temperature overnight. The membrane was then rinsed with deionized water to remove any traces of acid. The resulting, membrane was 4 mil thick. The room temperature membrane conductivity was 0.037 S/cm.

Example 4

This example discloses a membrane comprising 81.8% sPEEK and 18.2% of elastomeric copolymer acrylonitrile-vinylimidazol (30:1).

Sulfonated polyetheretherketone (SPEEK) (0.9 g) was dissolved in 15 g of dimethylacetamide (DMAC). To this solution, 30% ammonium hydroxide (1.6 g) was added. A solution of acrylonitrile-vinylimidazole copolymer (molar ratio 30:1) in DMAC was added (addition corresponds to 0.2 g of the copolymer). The resulting mixture was stirred overnight. The solution was cast onto a silanized glass frame (size 5"×5"). The membrane was dried at room temperature for two days, then vacuum dried at 60° C. for 8 hours. The resulting membrane was soaked in 1M $H_2SO_4$ at room temperature overnight. The membrane was then rinsed with deionized water to remove any traces of acid.

Example 5

This example discloses a membrane comprising 12% PVI and 88% elastomeric copolymer comprising elastomeric and acidic subunits (1:9).

A copolymer of acrylonitrile and 2-acryloamido-2-methyl-1-propane sulfonic acid (molar ratio 1:9) (0.88 g) was dissolved in dimethylacetamide (15 g). To this solution, 30% ammonium hydroxide (1.6 g) was added. A solution polyvinylimidazole (PVI) (0.12 g solids) in dimethylacetamide was added. The mixture was stirred overnight. The resulting solution was cast onto a silanized glass frame (size 5"×55"). The membrane is dried at room temperature for two days, then vacuum dried at 60° C. for 8 hours. The resulting membrane is soaked in 1M $H_2SO_4$ at room temperature overnight. The membrane is then rinsed with deionized water to remove any traces of acid.

Example 6

This example discloses a membrane comprising 60% sPEEK; 20% PBI and 20% of an elastomeric copolymer comprising elastomeric and acidic subunits (75:25) Sulfonated PEEK (0.60 g) is dissolved in DMAC (10 g). To this solution ammonium hydroxide is added (10 g). To this solution the acrylonitrile-2-acryloamido-2-methyl-1-propane sulfonic acid copolymer (molar ratio 75:25) in DMAC is added (solids content 0.2 g). To the resulting solution, polybenzimidazole (0.2 g) in dimethylacetamide is added. After stirring overnight, the homogeneous solution is cast on a silanized glass plate. The membrane is dried at 40° C. The polymer membrane is then soaked in 0.5M sulfuric acid solution overnight at room temperature, then boiled for two hours in 0.5 M sulfuric acid and finally repeatedly rinsed in deionized water.

Example 7

This example discloses a three-component membrane based on SPEEK/PBI/N-vinylimizadole, acrylonitrile copolymer (molar ratio 1:1). Each of the membranes was made as described in Example 6 except for the amount and/or type of polymer used. Conductivity results for a number of membranes are shown in Table 1.

TABLE 1

| Conductivity at room temperature | |
| --- | --- |
| Composition % (sPEEK/PBI/copolymer) | Conductivity (S/cm) |
| 75/20/5 | $4.4 \times 10^{-2}$ |
| 75/15/10 | $1.8 \times 10^{-2}$ |
| 75/10/15 | $2.33 \times 10^{-2}$ |
| 80/15/5 | $1.14 \times 10^{-1}$ |

Copolymer: N-vinylimizadole, acrylonitrile (1:1) (molar ratio)

PBI: polybenzimidazole

Example 8

This example discloses a three-component membrane based on SPEEK/PBI/N-vinylimizadole, acrylonitrile copolymer (molar ratio 1:2). Membranes were made as in Example 7 except that the amount and/or type of polymer was varied as indicated, Conductivity results at room temperature for two membranes are shown in Table 2.

TABLE 2

| Composition % (sPEEK/PBI/copolymer) | Conductivity (S/cm) |
| --- | --- |
| 75/20/5 | $1.04 \times 10^{-2}$ |
| 80/15/5 | $3.3 \times 10^{-2}$ |

Copolymer: N-vinylimizadole, acrylonitrile (1:2) (molar ratio)

PBI: polybenzimidazole.

Example 9

This example discloses a three-component membrane based on SPEEK/PBI/N-vinylimizadole, acrylonitrile copolymer (molar ratio 1:9). Membranes were made as in Example 7 except that the amount and/or type of polymer was varied as indicated. The conductivity at room temperature is set forth in Table 3.

TABLE 3

| Composition % (sPEEK/PBI/copolymer) | Conductivity (S/cm) |
|---|---|
| 80/15/5 | $7.7 \times 10^{-2}$ |

Copolymer: N-vinylimidazole, acrylonitrile (1:9) (molar ratio)
PBI: polybenzimidazole

Example 10

This example discloses a three-component (ternary blend) membrane based on SPEEK/PBI/N-vinylimizadole, N-vinylpyrrolidone, acrylonitrile terpolymer.

Sulfonated PEEK (1.5 g) is dissolved in 18 g of dimethylacetamide. 12 drops of ammonia are added to the solution. 1.0 g of a 10% solution of a terpolymer of N-vinylimidazole, N-vinylpyrrolidone and acrylonitrile with nominal molar ratio 1:2:2 is added to the solution. After this addition, 0.4 g of 6.5% solution of PBI in DMAc is added. After complete dissolution of all the components, the solution is cast on a silanized glass, dried at first overnight at room temperature, then at 60° C. for eight hours, and under vacuum for six hours.

The resulting 4 mil thick membrane is tested for its conductivity at room temperature by AC impedance. The conductivity was found to be 0.064 S/cm.

The foregoing were repeated for different amounts of PBI and Terpolymer were varied. Results of the conductivity at room temperature are summarized in Table 4.

TABLE 4

| Composition % (sPEEK/PBI/Terpolymer) | Conductivity (S/cm) |
|---|---|
| 75/20/5 | $6.4 \times 10^{-2}$ |
| 75/10/15 | $7.6 \times 10^{-2}$ |
| 75/15/10 | $8.4 \times 10^{-2}$ |

Terpolymer: N-vinylimidazole, N-vinylpyrrolidone, acrylonitrile (1:2:2) (molar ratio)
PBI: polybenzimidazole

Example 11

Figure 1:
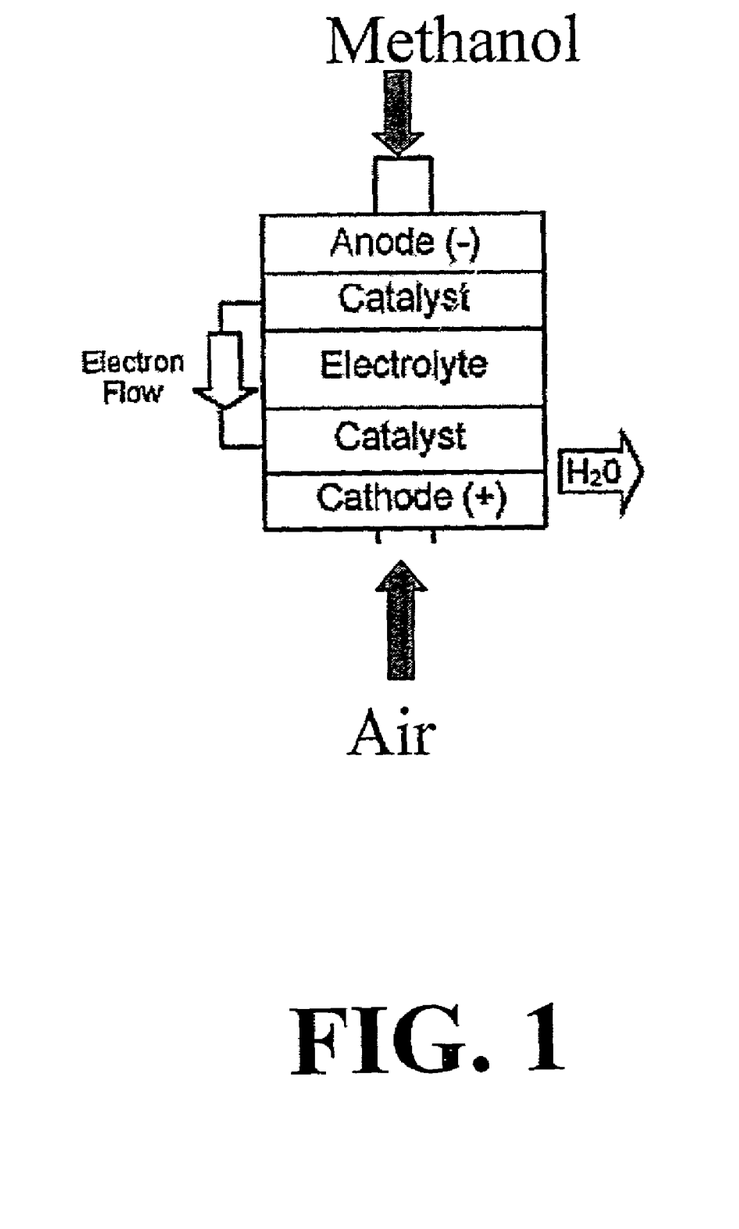
Figure 2:
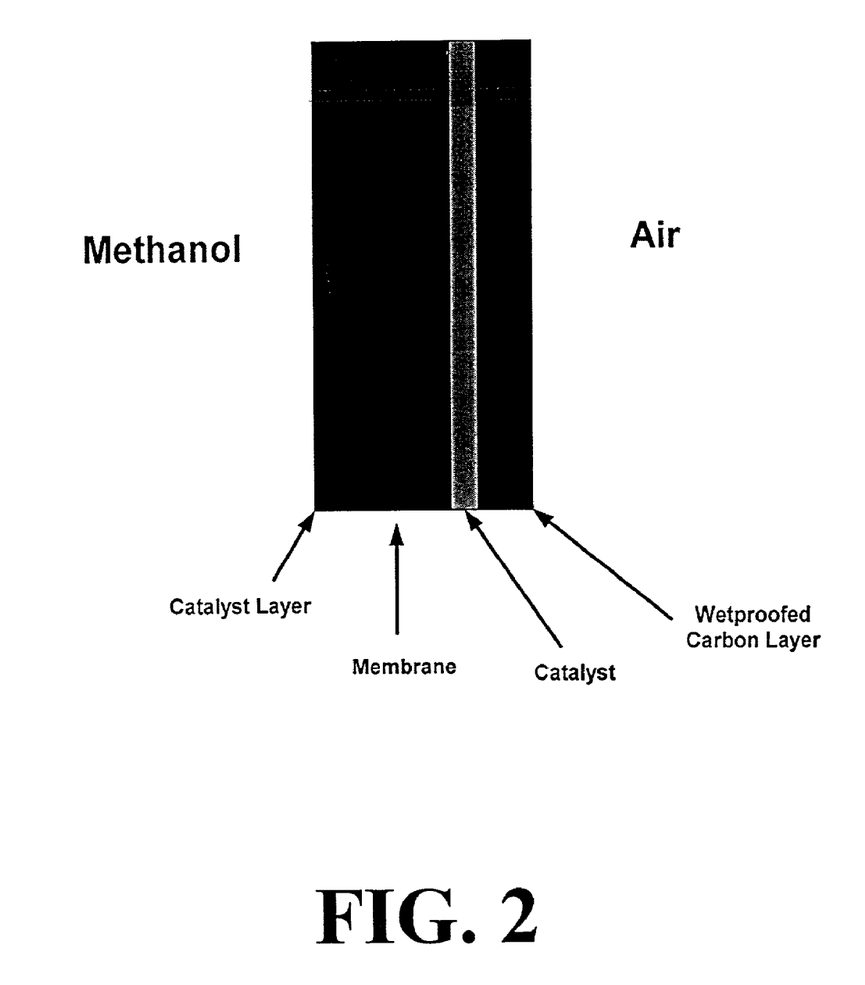
FIG. 2 is a cross section of a membrane electrode assembly (without electrodes) which includes the membrane of the invention, the first and second catalyst layers and generally at least one water and gas permeable layer on the cathodic side to provide for the transport of air to and water from the cathode catalyst layer. Generally a carbon paper or carbon cloth is used for such purposes. In addition, a carbon backing is preferably provided on the anode catalyst layer to protect the catalyst layer from damage from the electrodes. Since the backings generally contain conductive material such as carbon, the electrodes can be placed directly on the backing to complete the membrane electrode assembly.
Figure 3:
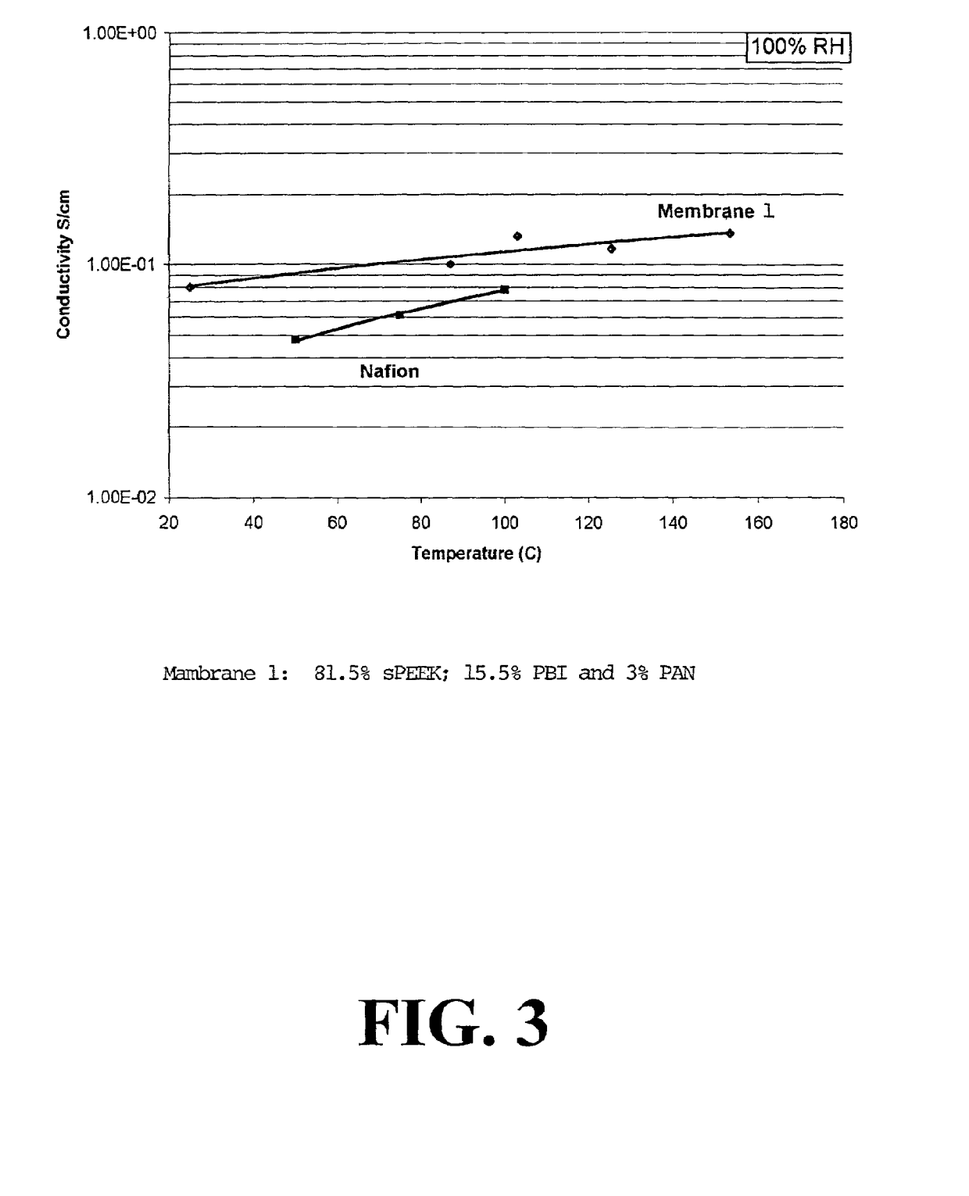
FIG. 3 compares the proton conductivity as a function of temperature for the prior art Nafion® membrane as compared to an embodiment of the invention wherein the membrane comprises 81.5% sPEEK, 15.5% PBI and 3% PAN.
Figure 4:
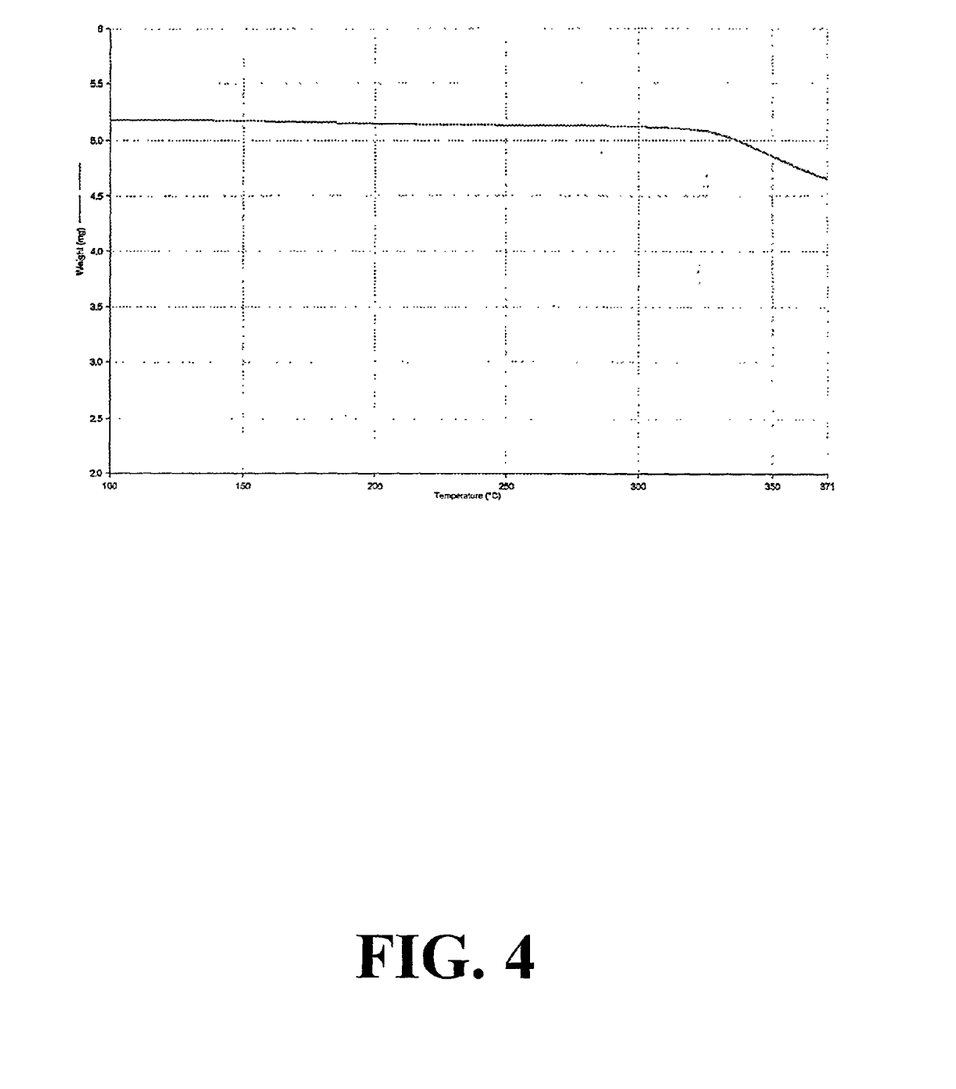
FIG. 4 shows the thermal stability of a membrane comprising 81.5% sPEEK, 15.5% PBI and 3% PAN. As can be seen, the membrane maintains its mass well above 300° C.
Figure 5:
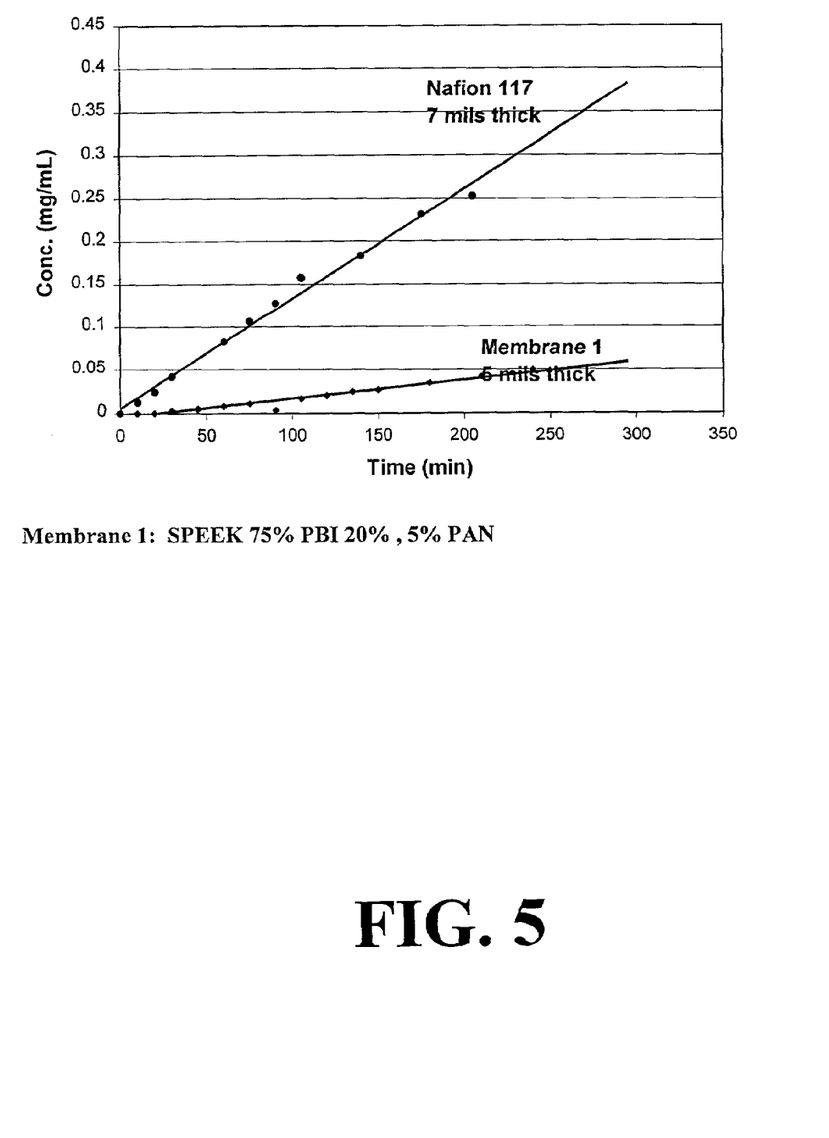
FIG. 5 shows the transport of methanol as a function of time across the prior art Nafion® membrane (7 mils thick) as compared to a membrane (5 mils thick) comprising 75% sPEEK, 20% PBI and 5% PAN.
Figure 6:
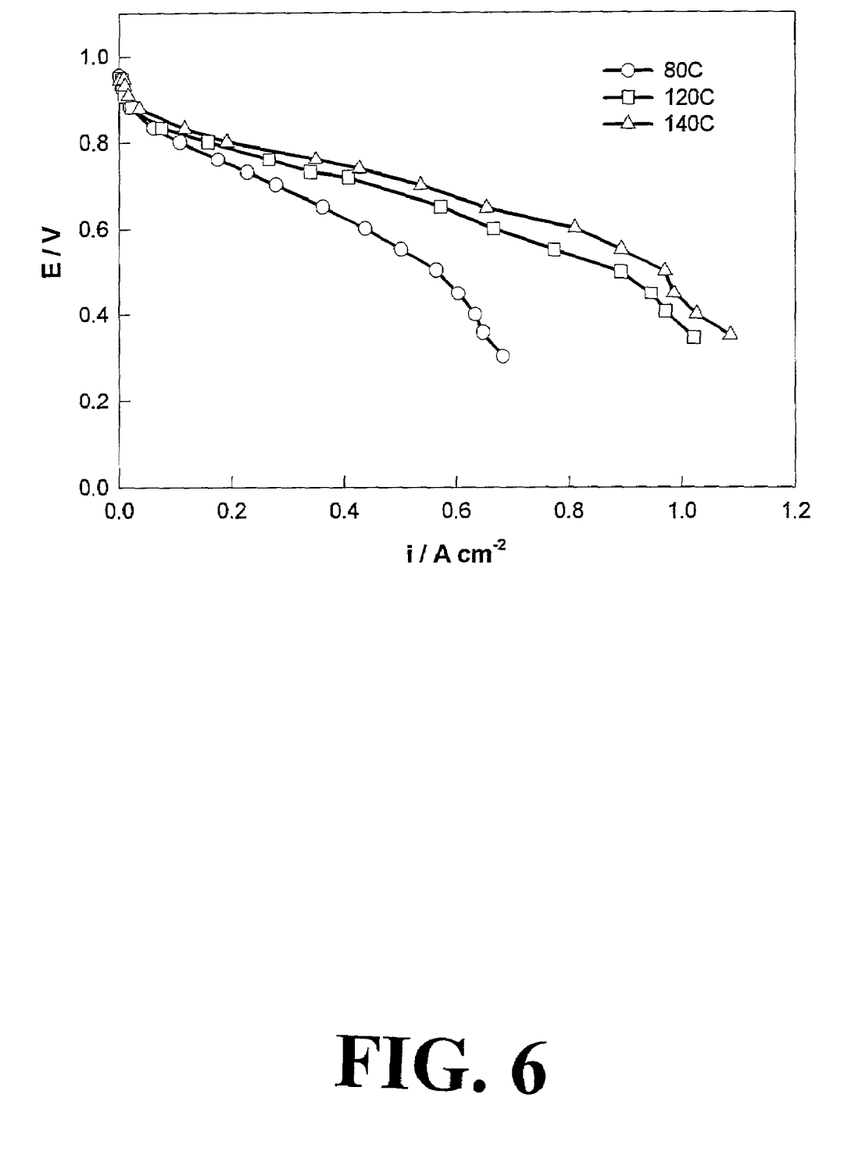
FIG. 6 shows the performance of a PEM fuel cell containing the membrane comprising a 75% sPEEK, 20% PBI and 5% PAN. Performance was measured by using hydrogen and air. Anode and cathode catalysts was 1 mg/cm$^2$ Pt/carbon with Nafion ionomer at 1.5 mg/cm$^2$ for the anode and 1 mg/cm$^2$ for the cathode. The fuel cell was run at 80° C., 120° C. and 140° C. The current density and cell membrane was as follows.

A polymer membrane comprising 75% sPEEK, 20% PBI and 5% PAN (2-in×4-in) having a membrane thickness of 5 mils was loaded in a flow cell. On one side of the membrane a 1 M solution of methanol in water was circulated at a flow rate of 2.4 L/hr. On the other side of the membrane deionized water was circulated at the same flow rate of 2.4 L/hr. Samples of the circulating deionized water were taken over a period of six hours. In each sample the concentration of methanol was monitored by gas chromatography. The test was performed at room temperature. FIG. 5 shows the concentration of methanol as a function of time for a Nafion® 117 membrane and the aforementioned ternary blend membrane.

Example 12

This example discloses a binary blend membrane comprised of 78% sulfonated PEEK and 22% of an elastomeric copolymer comprised of vinyl imidazole and acrylonitrile in a 4:1 molar ratio. SPEEK was vacuum dried for two hours at 100° C. in a tared vessel before obtaining a dry weight of 1.464 g. To this was added 10 g of DMAC and the solution stirred until the polymer was completely dissolved. To the resulting solution was added 2 g of a 30% aqueous solution of ammonium hydroxide in water. To this solution was added 7.508 g of a 6.50% solution of the poly(vinylimidazole-co-acrylonitrile) (4:1 molar ratio) elastomeric copolymer. After stirring overnight the homogeneous solution was cast into a frame 5"×5" on a glass plate and the membrane dried for two days at room temperature. The membrane was then dried at 60° C. for two hours before being soaked in 1M sulfuric acid overnight. The resultant membrane was rinsed thoroughly to remove residual sulfuric acid and was transparent, homogenous and stable in water. Conductivity results at room temperature for this membrane and for alternate compositions using this 4:1 molar ratio elastomeric copolymer are demonstrated in Table 5.

TABLE 5

| Composition % sPEEK-copolymer | Conductivity, S/cm Room Temperature |
|---|---|
| 85-15 | 0.090 |
| 80-20 | 0.023 |
| 78-22 | 0.027 |
| 75-25 | 0.012 |
| 73-27 | 0.0067 |
| 70-30 | 0.0010 |

Copolymer=4:1 molar ratio vinyl imidazole-acrylonitrile

Example 13

Binary blend membranes were made as in example 14 except that the elastomeric copolymer contained a 2:1 molar ratio of vinyl imidazole to acrylonitrile monomeric species. Conductivity results for these membranes are shown in Table 6.

TABLE 6

| Composition % sPEEK-Copolymer | Conductivity, S/cm Room Temperature |
|---|---|
| 82-18 | 0.052 |
| 78-22 | 0.048 |
| 75-25 | 0.025 |
| 73-27 | 0.021 |
| 70-30 | 0.012 |
| 67-33 | 0.004 |

Copolymer=2:1 molar ratio vinyl imidazole-acrylonitrile

Example 14

Binary blend membranes were made as in example 14 except that the elastomeric copolymer contained a 9:1 molar ratio of vinyl imidazole to acrylonitrile monomeric species. Conductivity results for these membranes are shown in Table 7.

TABLE 7

| Composition % sPEEK-Copolymer | Conductivity, S/cm Room Temperature |
|---|---|
| 82-18 | 0.082 |
| 79-21 | 0.029 |

Copolymer=9:1 molar ratio vinyl imidazole-acrylonitrile

Example 15

This example demonstrates a membrane consisting of 82% sulfonated PEEK and 18% poly(vinylimidazole) in a binary composition. PVI is preferred to PBI in that it is a cheaper material to manufacture is more readily available. Furthermore, PVI, unlike PBI, is not liquid crystalline. This liquid crystallinity characteristic of PBI makes membranes containing PBI more difficult to process and leads to inconsistent properties upon trying to reproduce results.

1.23 g of sulfonated PEEK were dissolved in 14.0 g DMAC. To this solution was added 12 drops of a 30% solution of ammonium hydroxide in water. To this was added 1.24 g of a 10% solution of poly(vinylimidazole) in DMAC. The membrane was cast in a frame 5"×5" on a glass plate and dried at room temperature for 2 days and at 60° C. for two hours. The membrane was soaked in 1M sulfuric acid overnight before it was rinsed to remove all traces of sulfuric acid. The resultant membrane was transparent, homogeneous and stable in water. Table 8 demonstrates conductivity data of several compositions.

TABLE 8

| Composition % sPEEK-PVI | Conductivity, S/cm Room Temperature |
|---|---|
| 77–23 | 0.015 |
| 79–21 | 0.024 |
| 82–18 | 0.036 |
| 85–15 | 0.095 |
| 87–13 | 0.097 |

Example 16

This example demonstrates a ternary blend membrane which is 97% sPEEK and PVI in a ratio 84-16 and 3% PAN. To 14.9 g of a 7.9% solution of sulfonated PEEK in DMAC was added an additional 3 g of DMAC, 0.672 g of a 6.25% solution of PAN in DMAC, 20 drops of a 30% solution of ammonium hydroxide in water, and 3.2 g of a 7% solution of PVI in DMAC. The solution was stirred overnight and cast in a 5"×5" frame on a glass plate and allowed to dry at room temperature for three days. The resultant membrane was dried at 60° C. for 2 hours and treated in 1M sulfuric acid overnight. The resultant membrane was homogeneous and demonstrated stability in water. Table 9 demonstrates conductivity of this composition and other compositions. The ratio of sulfonated PEEK to PVI is always expressed independently of its overall ratio to PAN.

TABLE 9

| Composition % (sPEEK/PVI)-PAN | Conductivity, S/cm Room Temperature |
|---|---|
| 95(77/23)-5 | 0.0012 |
| 95(79/21)-5 | 0.0068 |
| 95(82/18)-5 | 0.027 |
| 97(83.5/16.5)-3 | 0.037 |
| 97(85.5/14.5)-3 | 0.049 |
| 99(81/19)-1 | 0.020 |
| 97(82/18)-3 | 0.022 |
| 99(84/16)-1 | 0.059 |
| 97(84/16)-3 | 0.057 |
| 95(84/16)-5 | 0.032 |

Example 17

Figure 7:
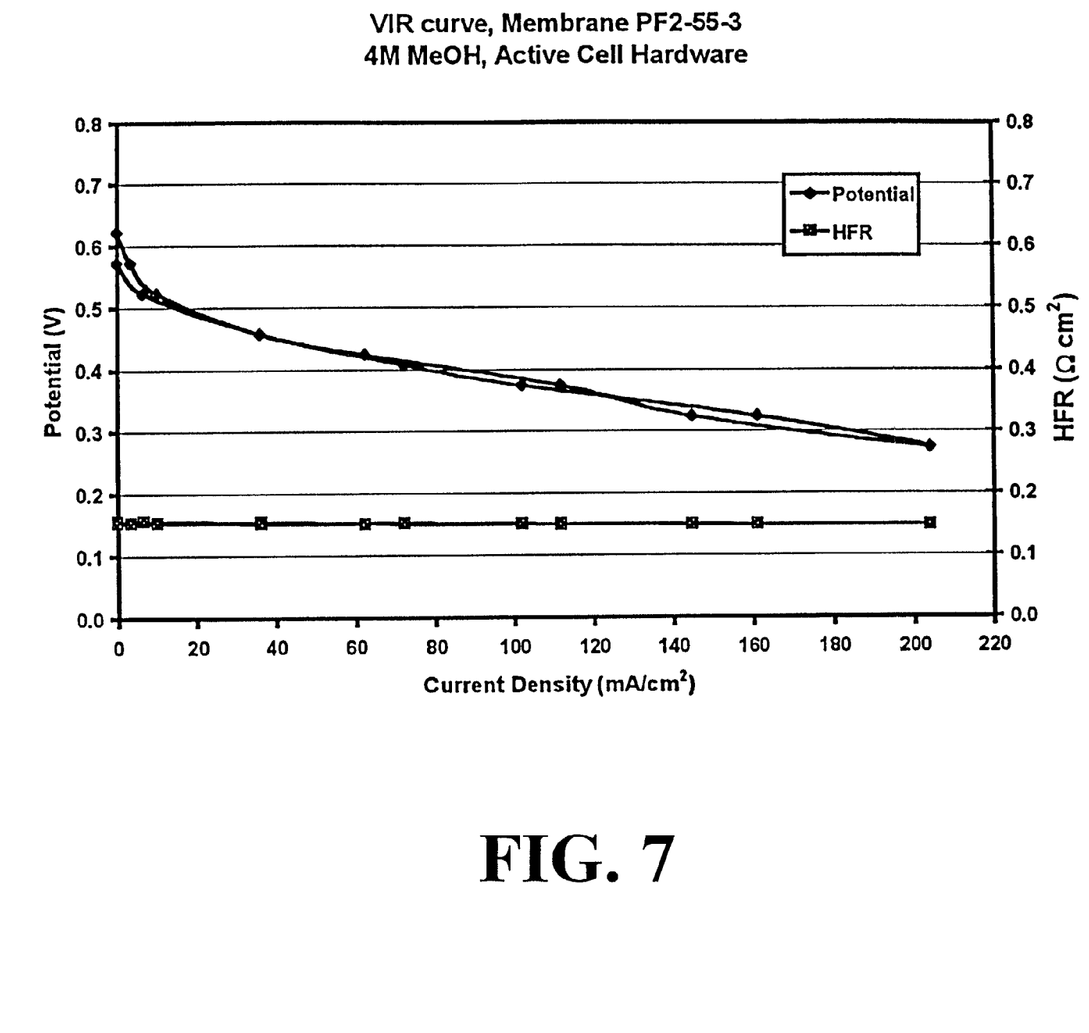
FIG. 7 shows the performance of a membrane electrode assembly comprising Pt—Ru catalyst and Pt catalyst layers, fuel cell using 4 molar methanol as organic fuel. (The MEA was prepared with a membrane comprising sPEEK 85.4%, PVI 11.6%, PAN 3%)

The following example demonstrates a ternary blend membrane which is 97% of sPEEK and PVI in a ratio of 88-12 and 3% PAN. In this example, the sPEEK was selected to have a degree of sulfonation of less than 100%. 0.824 g of sulfonated PEEK of a degree of sulfonation less than 100% was dissolved in 12 g DMAC. To this was added 0.407 g of a 7.107% solution of PAN in DMAC followed by 1.2 g of a 30% solution of ammonium hydroxide in water and 1.48 g of a 8.88% solution of PVI in DMAC. The solution was stirred overnight and cast in to a 5"×5" frame. The film was allowed to dry for 2 days at room temperature and for 2 hours at 60° C. The film was then soaked in 1.5M sulfuric acid overnight before being rinsed thoroughly in water. Table 10 demonstrates the conductivity of this membrane and other compositions. All these membranes demonstrated superior mechanical strength in water and reduced brittleness in the dry state than did any of the membranes in Example 18, which were not made by selection of a sulfonated PEEK of a degree of sulfonation of less than 100%. Table 11 shows the performance of PF2-55-3 (the 97(88/12)-3 formulation) in operation in an active direct methanol fuel cell. FIG. 7 demonstrates its performance using 4M methanol.

TABLE 10

| Composition % (sPEEK/PVI)-PAN | Conductivity, S/cm Room Temperature |
|---|---|
| 97(90/10)-3 | 0.038 |
| 97(88/12)-3 | 0.029 |
| 97(86/14)-3 | 0.016 |
| 97(84/16)-3 | 0.011 |

TABLE 11

| Test conditions Membrane PF2-55-3 | I @ 0.4 V | I @ 0.3 V | HFR ($\Omega cm^2$) | MeOH XO ($mA/cm^2$) |
|---|---|---|---|---|
| 1 M MeOH, 1 mL/min Air, 20 sccm, bypassed | 81 ($32\ mW\ cm^{-2}$) | 119 ($36\ mW\ cm^{-2}$) | 0.14 | |
| 2 M MeOH, 1 mL/min Air, 20 sccm, bypassed | 88 ($35\ mW\ cm^{-2}$) | 142 ($43\ mW\ cm^{-2}$) | 0.14 | 75 for 2 M 128 for 3 M |
| 4 M MeOH, 1 mL/min Air, 20 sccm, bypassed | 70 ($28\ mW\ cm^{-2}$) | 107 ($32\ mW\ cm^{-2}$) | 0.15 | 147 for 4 M |
| 4 M MeOH, 5 mL/min Air, 50 sccm, 35° C. | 82 ($33\ mW\ cm^{-2}$) | 180 ($54\ mW\ cm^{-2}$) | 0.155 | |

Example 18

In this example, ternary blend membranes were made using 91% of sulfonated PEEK and PVI in a 90-10 weight ratio and 9% of a copolymer of acrylonitrle and vinyl imidazole (9:1 molar ratio). 0.9 g sulfonated PEEK was dissolved in 15.8 g DMAC. To this was added, 30 drops of a 30% solution of ammonium hydroxide in water, 1 g of a 10% solution of the copolymer in DMAC and 1.55 g of a 6.45% solution of PVI in DMAC. The solution was stirred overnight and cast in a 5"×5" frame on a glass plate and allowed to dry at room temperature for three days. The resultant membrane was dried at 60° C. for 2 hours and treated in 1.5M sulfuric acid overnight. The resultant membrane was homogeneous and demonstrated stability in water. Table 12 demonstrates conductivity of this composition and other compositions.

TABLE 12

| Composition %(sPEEK/PVI)-copolymer | Conductivity, S/cm Room Temperature |
|---|---|
| 97(90/10)-3 | 0.07 |
| 95(90/10)-5 | 0.06 |
| 91(90/10)-9 | 0.04 |
| 84(88/12)-16 | 0.04 |

Copolymer=9:1 molar ratio of acrylonitrile to vinylimidazole

Example 19

The following example demonstrates a ternary blend membrane composed of 95% of sulfonated PEEK and PVI in a 85-15 weight ratio and 5% of a copolymer of acrylonitrile and acrylamido 2-methyl 1-propanesulfonic acid (monomer ratio=95/5 by weight). 1.0 g of sulfonated PEEK was dissolved in 23 g of DMAC. To this was added 1.18 g of a 5.771% solution of the copolymer in DMAC, 1.5 g of a 30% solution of ammonium hydroxide in water, and 1.72 g of a 10.390% solution of PVI in DMAC. The mixture was stirred overnight and cast into a 5"×5" frame on a glass slide, allowed to dry at room temperature for 2 days, and dried at 60° C. for two hours. The membrane was treated with 1.5M sulfuric acid overnight and then rinsed with deionized water. The resultant membrane was stable in water. The conductivity of several formulation is detailed in Table 13.

TABLE 13

| Composition %(sPEEK/PVI)-copolymer | Conductivity, S/cm Room Temperature |
|---|---|
| 95(85/15)-5 | |
| 90(85/15)-10 | |

Copolymer=95/5 weight ratio of acrylonitrile to acrylamido 2-methyl 1-propanesulfonic acid

Example 20

Preparation of acrylonitrile 1-vinylimidazole copolymers.

We have prepared several acrylonitrile 1-vinylimidazole copolymers. The following example describes the synthesis of acrylonitrile 1-vinylimidazole copolymer with molar ration of 9:1.

A mixture of acrylonitrile (127.2 g) and vinylimidazole (25.07 g) was dissolved in dimethylacetamide (235 g). To this solution AIBN (600 mg) was added and the mixture was heated at 60° C. under argon for one day and at 75° C. for nine hours. After cooling the amber mixture was poured into methanol (2L) with stirring. The precipitate was filtered and repeatedly washed with methanol. The solid was dried under vacuum at 100° C. After drying 112 g of the copolymer were isolated.

Example 21

Preparation of sPEEK

SPEEK was prepared according to two different methods: (1) sulfonation with chlorsulfonic acid followed by hydrolysis (as described in the literature), and (2) sulfonation with sulfuric acid in the presence of phosphorous pentoxide. Method 2 is described as follows.

30% fuming sulfuricacid (1.3 Kg) was added to a mixture of 96% sulfuric acid (2.22 Kg) stirring at 5° C. over twenty minutes. The mixture was further stirred for 30 minutes and checked for excess of SO3, before adding phosphorous pentoxide (200 g). After an additional hour, PEEK (346 g) was added to the mixture over five hours under argon maintaining the temperature at 5° C. The mixture was warmed to 11° C. over three hours and stirred for additional 10 hours. The solution was poured into a mixture of ice/concentrated HCl (3:1) over twenty-five minutes while stirring. The solid was filtered, washed with ice/conc. HCl 4:1(10 L) then ice water (14 L), cut up in small pieces and further washed with ice-water (12L). The crude sPEEK was dissolved in hot water (9 kg) and dialyzed in deionized water. The dialyzed aqueous solution was freeze dried and sPEEK (427 g) was isolated. The polymer was analyzed by elemental analysis (% S 8.77,% C 61.36,% H 3.28). The elemental analysis data indicate that the polymer was 100% sulfonated.

Example 22

Preparation of 30% Ethylated Polybenzimidazole

Polybenzimidazole (25.15) and lithium chloride (1.00 g) were placed in a 500-mL 3-neck flask and dried at 0.01 mmHg at 185–200° C. sand bath for two days. Then the contents of the flask were contacted with argon and allowed to reach room temperature. The flask was fitted with a condenser and mechanical stirrer. N-methylpyrrolidone (250–275 mL) was added and the mixture was stirred and reheated to 185–200° C. for two days. The reaction was cooled down at room temperature and lithium hydride (455 g) was added. The mixture was stirred 24 hours at 60° C. to give a blueish solution. The solution was cooled to ~40° C. and the ethyliodide (8.95 g dissolved in 10 mL NMP) was added dropwise. Immediate reaction takes place upon addition of the ethyl iodide. After the ethyl iodide addition was completed, the reaction was heated at 58° C. for 24 hours. The reaction was worked up by pouring the solution into 1.5 L of water under stirring (residual undissolved solid material was separated before pouring in water). The solid precipitate was isolated by decanting the water, and it was soaked in water overnight. The solid was ground in a blender with 500 mL of water and collected in Buchner funnel. The solid was stirred for four hours in 1.5L of water, collected by filtration, stirred overnight in 1.5L of water, collected by filtration, stirred four hours in acetone and soaked overnight in acetone. The solid was collected by filtration and dried at 100° C. at ~10 mmHg. The degree of ethylation of the final product was estimated to be ~30% by $^1$H NMR.

Example 23

Sulfonated polyetheretherketone (SPEEK) (0.77 g) was dissolved in 15 g of dimethylacetamide (DMAC). To this solution, 30% ammonium hydroxide (1.5 g) was added. A solution of polyacrylonitrile in DMAC was added (addition corresponds to 0.05 g of PAN), followed by an addition of 30% ethylated polybenzimidazole (E-PBI) (0.18 g). The resulting mixture was stirred overnight. The resulting solution was cast onto a silanized glass frame (size 5"×55"). The membrane was dried at 60° C. overnight, then vacuum dried at 80° C. for 8 hours. The resulting membrane was soaked in 1M $H_2SO_4$ at room temperature overnight. The membrane was then rinsed with deionized water to remove any traces of acid. The resulting membrane was tested for conductivity at room temperature (0.00625 S/cm), and at 60° C. (0.00793 S/cm). After hydration in water, the membrane water uptake was 77% on a weight basis.

Example 24

Sulfonated polyetherethersulfone (sPEES) (0.7 g) was dissolved in 10 g of dimethylacetamide (DMAC). To this solution, 30% ammonium hydroxide (1.0 g) was added. A solution of polyacrylonitrile in DMAC was added (addition corresponds to 0.05 g of PAN), followed by an addition of polybenzimidazole (0.20 g). The resulting mixture was stirred overnight. The resulting solution was cast onto a silanized glass frame (size 5"×55"). The membrane was dried at 60° C. overnight, then vacuum dried at 80° C. for 8 hours. The resulting membrane was soaked in 1M $H_2SO_4$ at room temperature overnight. The membrane was then rinsed with deionized water to remove any traces of acid. The resulting membrane was tested for conductivity at room temperature (0.00602 S/cm), and at 60° C. (0.00655 S/cm). After hydration in water, the membrane water uptake was 52.6% on a weight basis.

Example 25

Sulfonated polyetherethersulfone (SPEES) (0.80 g) was dissolved in 15 g of dimethylacetamide (DMAC). To this solution, 30% ammonium hydroxide (1.0 g) is added. A solution of polyvinylidenefluoride (PVDF) in DMAC was added (addition corresponds to 0.05 g of PVDF), followed by an addition of polybenzimidazole (0.20 g). The resulting mixture is stirred overnight. The resulting solution is cast onto a silanized glass frame (size 5"×55"). The membrane is dried at 60° C. overnight, then vacuum dried at 80° C. for 8 hours. The resulting membrane is soaked in 1M $H_2SO_4$ at room temperature overnight. The membrane is then rinsed with deionized water to remove any traces of acid. The resulting membrane was tested for conductivity at room temperature (0.00561 S/cm). After hydration in water, the membrane water uptake was 52% on a weight basis.

What is claimed is:

1. A polymer electrolyte membrane comprising a first polymer comprising acidic subunits and a second polymer comprising basic subunits, wherein the polymer electrolyte membrane further comprises an elastomeric polymer comprising elastomeric subunits, wherein said basic subunits comprise vinylimidazole, and wherein said second polymer comprises polyvinylimidazole and wherein said acidic subunits comprise 2-acrylonamide-2-methyl-1 propane sulfonic acid and said elastomeric subunits comprise acrylonitrile.

2. The polymer electrolyte membrane of claim 1 wherein said elastomeric polymer comprises a semi-interpenetrating network in said membrane.

3. The polymer electrolyte membrane of claim 1, wherein said membrane has an electrical conductivity greater than about 0.005 S/cm.

4. The polymer electrolyte membrane of claim 1 wherein said membrane is substantially impermeable to methanol.

* * * * *